UNITED STATES PATENT OFFICE.

PAUL D. POTTER, OF MADISON, WISCONSIN.

PROCESS FOR THE MANUFACTURE OF CHROME-YELLOW.

No. 868,807.  Specification of Letters Patent.  Patented Oct. 22, 1907.

Application filed December 29, 1906. Serial No. 350,079.

*To all whom it may concern:*

Be it known that I, PAUL D. POTTER, a citizen of the United States, residing at Madison, in the county of Dane, State of Wisconsin, have invented a certain new and useful Improved Process for the Manufacture of Chrome-Yellow; and I do hereby declare the following to be a full, clear, and exact description of the same.

In accordance with the present invention chromium oxid and lead carbonate are commingled and subjected to the action of heat under oxidizing conditions thereby forming lead chromate or popularly speaking chrome yellow. When native ores are employed, as is preferred for commercial reasons, the lead chromate produced is necessarily mixed with the gangue of the ores and to separate it from the gangue the mass is crushed and digested with a solvent solution as for instance, caustic soda or potassa. The solution is filtered to separate it from the gangue and is then neutralized with an acid, preferably acetic, to precipitate the lead chromate. The precipitate is separated from the liquid preferably by filtering. After being washed and dried it is ready for use. Obviously, the chemicals may be regenerated by processes now known, or the sodium or potassium acetate may be handled commercially as a by-product.

In carrying the invention into practice the following procedure is preferred, although I do not wish to be limited specifically thereto. A furnace is provided in which the ores may be agitated and subjected to the action of oxidizing flames. This furnace may be of the reverberatory type having a suitable lining and bottom. Provision is made for agitating or stirring and raking out or discharging the charge from the furnace. Into this furnace native lead carbonate and chrome iron ore are charged in the proportions of 689 lbs. of the first and 304 lbs. of the latter. In these proportions it is expected that the ores will contain approximately 534 pounds of lead carbonate and 152 pounds of chromium oxid respectively. As a flux one and one half pounds of lime or an equivalent amount of limestone may be added for each pound of chrome ore, say 456 lbs., but the reaction forming the chrome yellow will take place with or without the lime being present.

The charge is heated by oxidizing flames and agitated or stirred. After about four hours more or less the charge is removed from the furnace crushed and digested with a caustic soda solution, preferably in an iron or wooden tank. The solution is then filtered into another tank or the gangue content otherwise separated from the liquid. The solution is neutralized with acetic acid and the chrome yellow precipitated. The precipitate is allowed to settle and the liquid drawn off through a filter press. After washing, filtering and drying, the chrome yellow is ready for the market. If it be not desired to utilize the sodium acetate, as a by-product, enough sulfuric acid may be added to change it into sulfate. This liberates the acetic acid. The whole is then evaporated and the steam condensed thus recovering the acetic acid which may be used over again. The residue left after evaporation is sodium sulfate which may be sold as such or may be heated in a reverberatory furnace with lime stone and fine coal or slack to change it to the carbonate. The latter is digested with slaked lime and changed to caustic soda which, after filtering, is again ready for treating another charge from the furnace.

In making dark or orange shades of chrome yellow a quantity of acid insufficient to neutralize all the solvent is added and the whole allowed to stand for some time before filtering. The chrome yellow remaining in solution may be afterwards precipitated by complete neutralization. In making light shades, sulfuric acid or both sulfuric and acetic acids are added thereby obtaining a mixed precipitate of lead chromate and lead sulfate.

It will be understood that in the claims I use the term "a chromium compound" as a broad term intending to include thereby not only material having the formula $Cr_2O_3$ but also native ores carrying a large percentage of chromium such as chrome iron ore having the formula of $Cr_2O_3FeO$. Chrome iron ore is perhaps the most convenient and abundant of the species included under the broad understanding above referred to and it is therefore claimed herein specifically.

What I claim as new is:

1. The process of manufacturing chrome yellow which consists in combining a chromium compound and lead carbonate in the presence of heat and under oxidizing conditions.

2. The process of manufacturing chrome yellow which consists in combining a chromium compound and lead carbonate in the presence of heat and under oxidizing conditions, digesting the product in a solvent solution, precipitating the same and separating the liquid therefrom.

3. The process of manufacturing chrome yellow which consists in subjecting chrome iron ore and native lead carbonate to the action of an oxidizing flame and then separating the chrome yellow from the gangue.

4. The process of manufacturing chrome yellow which consists in combing a chromium compound and lead carbonate in the presence of heat and under oxidizing conditions and agitating the mass under treatment.

5. The process of manufacturing chrome yellow which consists in subjecting chrome iron ore and native lead carbonate to the action of an oxidizing flame, agitating the mass and subsequently separating the chrome yellow from the gangue.

6. The process of manufacturing chrome yellow which consists in subjecting chrome iron ore and lead carbonate to the action of an oxidizing flame, agitating the mass being treated and subsequently dissolving the chrome yellow in a solvent liquid, precipitating the same and separating the liquid therefrom.

7. The process of manufacturing chrome yellow, which consists in subjecting chrome iron ore and lead carbonate to the action of an oxidizing flame, agitating the mass being treated, and subsequently crushing the mass, dissolving the chrome yellow in a caustic soda solution, separating the liquid from the gangue and precipitating the chrome yellow by adding a neutralizing agent to the liquid.

8. The process of manufacturing chrome yellow which consists in subjecting chrome iron ore and lead carbonate and a flux to the action of heat under oxidizing conditions and then separating the chrome yellow from the gangue.

9. The process of manufacturing sulfated chrome yellow which consists in subjecting chrome iron ore and lead carbonate to the action of heat under oxidizing conditions, dissolving the chrome yellow in a solvent liquid and subsequently precipitating both lead chromate and lead sulfate by the addition of neutralizing agents to the liquid.

PAUL D. POTTER.

Witnesses:
SARAH E. CAMPBELL,
CHARLES G. RILEY.